United States Patent [19]

Benham et al.

[11] Patent Number: 4,966,951

[45] Date of Patent: Oct. 30, 1990

[54] HIGH STRENGTH LINEAR, LOW DENSITY POLYETHYLENE POLYMERIZATION PROCESS

[75] Inventors: Elizabeth Benham; Max P. McDaniel; Fay W. Bailey, all of Bartlesville, Okla.

[73] Assignee: Phillips Petroleum Company, Bartlesville, Okla.

[21] Appl. No.: 249,740

[22] Filed: Sep. 26, 1988

[51] Int. Cl.⁵ .................. C08F 2/14; C08F 210/02
[52] U.S. Cl. ......................... 526/106; 526/104; 526/130; 526/134; 526/348.4; 526/348.5
[58] Field of Search ............ 526/104, 106, 348.4, 526/105, 130, 134

[56] References Cited

U.S. PATENT DOCUMENTS

| | | | |
|---|---|---|---|
| 3,248,179 | 4/1966 | Norwood | 422/133 |
| 3,645,992 | 2/1972 | Elston | 526/348.2 X |
| 3,887,494 | 6/1975 | Dietz | 252/452 |
| 4,424,320 | 1/1984 | McDaniel | 526/106 |
| 4,503,201 | 3/1985 | McDaniel et al. | 526/106 |
| 4,517,345 | 5/1985 | Eve et al. | 526/106 X |
| 4,593,079 | 6/1986 | Rekers et al. | 526/100 |
| 4,619,980 | 10/1986 | McDaniel et al. | 526/96 |
| 4,672,096 | 6/1987 | Nowlin | 526/116 |
| 4,735,931 | 4/1988 | McDaniel et al. | 502/107 |

Primary Examiner—Joseph L. Schofer
Assistant Examiner—F. M. Teskin
Attorney, Agent, or Firm—Lynda S. Jolly

[57] ABSTRACT

A copolymer of ethylene and a higher alpha-olefin, preferably 1-hexene and/or 4-methyl-1-pentene, can be produced using an activated and subsequently carbon monoxide reduced chromium containing catalyst and a trialkyl boran cocatalyst. The polymerization process must be carefully controlled to produce a copolymer resin that can be made into a tough, impact resistant film.

10 Claims, No Drawings

HIGH STRENGTH LINEAR, LOW DENSITY POLYETHYLENE POLYMERIZATION PROCESS

BACKGROUND

This invention relates to the copolymerization of a mono-1-olefin monomer, such as ethylene, with a higher alpha-olefin comonomer.

It is well known that mono-1-olefins such as ethylene can be polymerized with catalyst systems employing vanadium, chromium or other metals on a support such as alumina, silica, aluminum phosphate, titania, zirconia, magnesia and other refractory materials. Initially such catalysts were used primarily to form homopolymers of ethylene. It soon developed, however, that many applications required polymers which were more impact resistant than ethylene homopolymers. Consequently, in order to produce polymer having short chain branching like the more flexible free radical polymerized ethylene polymers, comonomers such as propylene, butene, hexene or other higher olefins were copolymerized with the ethylene to provide resins tailored to specific end uses.

Unfortunately, these comonomers do not efficiently incorporate into the polymer and, therefore, excessive amounts of expensive comonomer must be used. Furthermore, the resultant copolymers are not always linear, low-density copolymers and, thus, are physically weak copolymers, having low impact resistance, especially when made into films. In addition, polymerization operating parameters can create conditions in which the copolymer swells during polymerization and interferes with the polymerization and copolymer recovery processes.

SUMMARY OF THE INVENTION

It is an object of this invention to provide an improved polymerization process.

It is another object of this invention to provide copolymers of ethylene and higher alpha-olefins having a toughness imparted by short chain branching.

It is yet another object of this invention to provide copolymers of ethylene and higher alpha-olefins that can be easily processed into a tough, impact resistant film.

In accordance with this invention, a slurry polymerization process comprising contacting in a reaction zone under polymerization conditions, at a temperature in the range of about 82° to about 88° C., a paraffin, cycloparaffin, or aromatic hydrocarbon diluent; ethylene monomer; a comonomer selected from the group consisting of 1-butene, 1-pentene, 1-hexene, 1-octene, and/or 4-methyl-1-pentene, in an amount in the range of about 5 to about 20 weight percent, based on the amount of ethylene; a trialkyl boron compound in an amount in the range of about 0.5 to about 4 parts per million (ppm), based on the mass of diluent; and a catalyst comprising chromium supported on a silica-titania support, wherein said support comprises from about 2 to about 10 weight percent titanium, based on the weight of the support, and wherein said catalyst has been activated in an oxygen-containing ambient and subsequently reduced in the presence of carbon monoxide and optionally, an inert ambient, is provided.

In accordance with another embodiment of this invention, a copolymer of ethylene and higher alpha-olefins which can be characterized as linear, low-density polyethylene and has improved toughness and impact resistance, is provided.

DESCRIPTION OF THE PREFERRED EMBODIMENTS

Catalyst

The catalyst support must be a silica-titania support. As used in this application, the reference to silica means a silica-containing material generally composed of 80 to 100 weight percent silica, the remainder, if any, being selected from alumina, boria, magnesia, thoria, zirconia, or mixtures thereof. For instance, the silica-containing material can consist essentially of silica and no more than 0.2 weight percent of alumina or other metal oxide. Other ingredients which do not adversely affect the catalyst or which are present to produce some unrelated result can also be present. Preferably, the support contains about 2 to about 10 weight percent titanium (Ti), based on the weight of the support. Most preferably, the support contains about 5 to about 8 weight percent titanium, in order to produce a polymer with the most desirable characteristics.

Silica-titania supports are well known in the art and can be produced as disclosed in Dietz, U.S. Pat. No. 3,887,494, the disclosure of which is hereby incorporated by reference.

The catalyst component must be a chromium compound. The chromium component can be combined with the silica component in any manner known in the art such as by forming a coprecipitated tergel of the silica, titanium, and chromium components. Alternatively an aqueous solution of a water soluble chromium component can be added to a hydrogel of silica-titanium component. Suitable water soluble chromium compounds include, but are not limited to, chromium nitrate, chromium acetate, and chromium trioxide. Alternatively a solution of a hydrocarbon soluble chromium component such as tertiary butyl chromate, a diarene chromium compound, biscyclopentadientyl chromium II or chromium acetyl acetonate can be used to impregnate the silica-titania xerogel which results from removal of water from the cogel.

The chromium component is used in an amount sufficient to give 0.05 to 5, preferably 0.5 to 2 weight percent chromium based on the total weight of the chromium and support after activation.

The resulting chromium component on the predominantly silica support is then subjected to activation in an oxygen-containing ambient in the manner conventionally used in the art. Because of economy, the preferred oxygen-containing ambient is air, preferably dry air. The activation is carried out at an elevated temperature for about one half to about 50 hours, preferably about 2 to about 10 hours at a temperature within the range of 300° to 1000° C., preferably about 300° to about 800° C. Under these conditions, at least a substantial portion of any chromium in a lower valent state is converted to the hexavalent form by this calcination procedure.

The resulting calcined supported catalyst component is cooled and then subjected to at least partial reduction of the hexavalent chromium to a lower valent state prior to combining with the cocatalyst. The reducing agent must be carbon monoxide in order to effectively incorporate a comonomer into the copolymer. If a reducing agent other than carbon monoxide is used, higher amounts of comonomer are needed in the reaction zone to achieve similar amounts of comonomer incorporation into the resultant copolymer. Generally, the calcined catalyst is directly subjected to the reducing agent, although intervening steps may be employed, if desired.

The carbon monoxide can be employed at temperatures between about 300° to about 500° C. although it is preferably employed at temperatures in the range of about 350° to about 450° C. for best chromium reduction. The partial pressure of the reducing gas in the reduction operation can be varied from subatmospheric pressures to relatively high pressures, but the simplest reducing operation is to utilize essentially pure carbon monoxide at about atmospheric pressure.

The reduction time can vary from a few minutes to several hours or more. The extent of reduction can be followed by visual inspection of catalyst color. The color of the initial activated catalyst is generally orange, indicating the presence of hexavalent chromium. The color of the reduced catalyst employed in the invention is blue, indicating that all or substantially all of the initial hexavalent chromium has been reduced to lower oxidation states, generally the divalent state.

The course of the reduction of the air-activated orange catalyst with carbon monoxide can be determined exactly by pulse titration. A known amount of carbon monoxide is added per pulse and the amount of evolved carbon dioxide is measured. When reduction is complete only carbon monoxide will be present and the catalyst is blue in color. The reduced blue catalyst can be titrated with pulses of oxygen to convert the catalyst to the original orange color. When oxidation is complete, oxygen will be evident in the offgas.

After reduction, the reduced supported catalyst component is cooled to about room temperature, e.g. about 25° C., in an inert atmosphere such as argon or nitrogen to flush out the carbon monoxide. After this flushing treatment the catalyst is kept away from contact with either carbon monoxide or oxygen.

The cocatalyst must be a trialkyl boron compound, wherein the alkyl group has from about 1 to about 10 carbon atoms, preferably about 2 to about 4 carbon atoms. Trialkyl boron compounds must be used as cocatalysts because these compounds are effective agents to improve polymer properties, such as, for example, to retard polymer swelling during polymerization. By far, the most preferred cocatalyst is triethyl borane.

The cocatalyst is used in an amount within the range of about 0.5 to about 4 parts per million (ppm), or milligrams per kilogram (mg/kg), based on the amount of diluent in the reactor. Preferably, the cocatalyst is used in an amount within the range of about 0.5 to about 3 ppm, and most preferably, within the range of about 1 to about 2 ppm, for cost effectiveness and best polymer properties.

Reactants

The polymers produced according to the process of this invention must be copolymers. This inventive process is of particular applicability in producing copolymers of ethylene and higher alpha-olefins. Ethylene monomer must be polymerized with a comonomer from the group consisting of 1-butene, 1-pentene, 1-hexene, 1-octene, 4-methyl-1-pentene, and mixtures thereof. Ethylene is the most preferred monomer, due to the advantageous properties of the resultant copolymer. Preferably, the comonomer is 1-hexene and/or 4-methyl-1-pentene, to achieve maximum polymer toughness.

The comonomer is added to the polymerization reactor, or reaction zone, in an amount within the range of about 7 to about 20 weight percent, preferably within the range of about 10 to about 18 weight percent, based on the weight of the monomer. Most preferably, the copolymer is present in the reaction zone within the range of about 12 to about 16 weight percent in order to produce a polymer with the most desired properties, such as, for example, improved tear strength and dart impact strength.

Polymerization

Polymerization of the monomer and comonomer must be carried out under slurry, also known as particle form, polymerization conditions wherein the temperature is kept below the temperature at which polymer goes into solution. Such polymerization techniques are well known in the art and are disclosed, for instance, in Norwood, U.S. Pat. No. 3,248,179, the disclosure of which is hereby incorporated by reference.

The temperature of the polymerization reactor, or reaction zone, according to this invention, is critical and must be kept within the range of about 82° to about 88° C., preferably within the range of about 82° to about 87° C. Most preferably, the reaction zone temperature is within the range of 82° to 85° C. Although higher reactor temperatures can be used, operating outside of the specified temperature ranges produces a copolymer which can be more subject to swelling during polymerization, can have a higher density, and/or can have reduced impact and/or tear strength.

The slurry process is generally carried out in an inert diluent (medium), such as, for example, a paraffin, cycloparaffin, and/or aromatic hydrocarbon. Exemplary diluents include, but are not limited to propane, n-butane, isobutane, n-pentane, 2-methylbutane (isopentane), and mixtures thereof. Isobutane is the preferred diluent due to low cost and ease of use.

Pressures in the particle form process can vary from about 110 to about 700 psia (0.76–4.8 MPa) or higher. The catalyst is kept in suspension and is contacted with the monomer and comonomer(s) at sufficient pressure to maintain the medium and at least a portion of the monomer and comonomer(s) in the liquid phase. The medium and temperature are thus selected such that the copolymer is produced as solid particles and is recovered in that form. Catalyst concentrations can be such that the catalyst content ranges from 0.001 to about 1 weight percent based on the weight of the reactor contents.

Two preferred polymerization methods for the slurry process are those employing a loop reactor of the type disclosed in Norwood and those utilizing a plurality of stirred reactors either in series, parallel or combinations thereof wherein the reaction conditions are different in the different reactors. For instance, in a series of reactors a chromium catalyst which has not been subjected to the reduction step can be utilized either before or after the reactor utilizing the catalyst system of this invention. In another specific instance, a conventional chromium oxide on a predominantly silica support can be utilized in a reactor in parallel with a reactor utilizing the catalyst system of this invention and the resulting polymerization influence combined prior to recovering the copolymer.

The molecular weight of the copolymer can be controlled by various means known in the art such as adjusting the temperature (higher temperature giving lower molecular weight), introducing hydrogen to lower the molecular weight or varying the catalyst compounds.

The catalyst, cocatalyst, monomer, and comonomer can be added to the reaction zone in any order, according to any method known in the art. For example, the catalyst, cocatalyst, monomer, and comonomer can be added similtaneously to the reaction zone. If desired, the catalyst and cocatalyst can be precontacted in an inert ambient prior to contacting the monomer and/or comonomer. If the catalyst and cocatalyst are precontacted, as disclosed by McDaniel et al in U.S. Pat. No. 4,735,931, herein incorporated by reference, some comonomer can be generated in-situ; therefore, the amount of comonomer that is affirmatively added to the reaction zone can be reduced, but still remain within the ranges disclosed above.

Product

The polymers produced in accordance with this invention must be a copolymer of ethylene and at least one higher alpha-olefin. The comonomer, or higher alpha-olefin, in the polymerization reactor, whether affirmatively added or generated in-situ, is very efficiently incorporated into the copolymer. The copolymer product contains from about 1.5 to about 4 mole percent, preferably from about 2 to about 3.5 mole percent comonomer. Most preferably, the comonomer is present in the copolymer within the range of about 2.5 to about 3 mole percent for the best copolymer properties.

Comparison of the amount of comonomer added to the reaction zone with the amount of comonomer incorporated into the copolymer shows that, according to this invention, the comonomer is very efficiently incorporated into the copolymer. Thus, high levels of comonomer in the polymerization reactor are unnecessary because the comonomer is so effectively incorporated into the copolymer. Furthermore, if comonomer is generated in-situ in the reaction zone, even less comonomer can be added to the reaction zone in order to produce a copolymer with similar concentrations of comonomer, compared to a copolymer wherein no comonomer is generated in-situ.

The copolymers produced according to this invention are impact resistant, tough, linear, low-density copolymers. As used in this disclosure, a short chain branch (SCB) is defined as a linear or branched carbon chain connected to the copolymer backbone, wherein the SCB has from about 1 to about 10 carbon atoms connected to, yet off of, the copolymer backbone. The number of SCBs per 10,000 backbone carbons for copolymers produced according to this invention usually ranges from about 70 to about 200, preferably from about 100 to about 180. Most preferably, the number of SCBs per 10,000 backbone carbon atoms is within the range of about 120 to about 160. The density of the inventive copolymers ranges from about 0.915 to about 0.932 g/cc, preferably from about 0.918 to about 0.930 g/cc. Most preferably, the copolymer density is within the range of about 0.920 to about 0.928 g/cc.

The copolymers produced according to this invention exhibit decreased swelling in the polymerization reactor during the polymerization reaction. Decreased polymer swelling is advantageous because the polymerization reactor is less susceptible to fouling during the polymerization process; a polymer with low swell during polymerization usually has a desirable high bulk density; and polymer productivity, expressed as grams of polymer produced per gram of catalyst (g/g), can be increased. As stated earlier, a trialkyl boron cocatalyst is the most effective to control and minimize polymer swelling.

Another physical characteristic of the inventive copolymer includes the heterogeneity index (HI), which is defined as the weight average molecular weight (Mw) divided by the number average molecular weight (Mn), is relatively low. A high HI signifies a broad molecular weight distribution and a low HI indicates a narrow molecular weight distribution. Copolymers of this invention usually have a HI within the range of about 10 to about 20, preferably within the range of about 12 to about 18, and most preferably within the range of about 13 to about 17.

The ratio of the high load melt index (HLMI) to the melt index (MI), expressed as HLMI/MI, indicates how easily the molten polymer flows under pressure. The HLMI/MI ratio for copolymers of this invention usually are within the range of about 70 to about 150, preferably within the range of about 80 to about 120, and most preferably within the range of about 75 to about 100.

The toughness, or impact resistance, of a polymer is shown by the dart impact and Spencer impact test results. Higher test results mean that the polymer is tougher. Unfortunately, testing equipment is limited and incapable of testing above certain values. Inventive copolymers produced according to this process usually have a dart impact of greater than about 400 grams for 1 mil film, preferably greater than about 450 g. Most preferably, the dart impact property of the inventive copolymers is greater than about 500 g. Most dart impact test equipment has a maximum attainable value of greater than about 700 g; i.e., 700 g is the highest reading. The Spencer impact value of the inventive copolymers is usually greater than about 1.2 Joules for 1 mil film, and preferably, greater than about 1.4 J. Most preferably, the Spencer impact properties of the copolymers produced according to this invention are greater than about 1.2 J. The highest impact value obtainable on most Spencer impact testing equipment is greater than about 1.6 J; i.e., 1.6 J is the highest reading.

EXAMPLES

Ethylene-hexene copolymers were prepared in a continuous particle form process by contacting the catalyst with the monomers, employing a liquid full loop reactor, having a volume of 23 gallons (87 liters), isobutane as the diluent, and occasionally some hydrogen to regulate the molecular weight of the product. The reactor was operated to have a residence time of 1.25 hrs. The reactor temperature was varied over the range of 80° to 88° C., to control molecular weight, and the pressure was 4 Mpa (580 psi). At steady state conditions, the isobutane feed rate was 46 l/hr, the ethylene feed rate was about 30 lbs/hr, and the hexene feed rate was varied to control the density of the product polymer. Polymer was removed from the reactor at the rate of 25 lbs/hr.

The tests were conducted according to the following procedures:

Dart Impact (g); ASTM D 1709-75. Energy needed to rupture one mil thick film upon impact of a free falling dart. This method establishes the weight of the dart dropped from a height of 26 inches which causes 50 percent of the samples to break. The staircase method is used to determine the 50 percent failure level and the missile weight increment is 15 g. In all instances, the film was 1 mil in thickness, unless otherwise indicated.

Tear Resistance (g/mil); ASTM D 1922. This is a modification for polymer film adapted from the Elmendorf tear test used for paper. This method determines the average energy in grams required to propagate a tear through 2.5 inches of film in the machine extrusion direction (MD) or transverse direction (TD) as indicated. In all instances, the film was 1 mil in thickness.

Density (g/ml): ASTM D 1505-68 and ASTM D 1928, Condition C. Determined on a compression molded sample, cooled at about 15° C. per minute, and conditioned at room temperature for about 40 hours.

High Load Melt Index (HLMI)(g/10 min): ASTM D 1238. Determined at 190° C. with a 21,600 gram weight.

Melt Index (MI)(g/10 min): ASTM D 1238. Determined at 190° C. with a 2,160 gram weight.

Spencer Impact Resistance (J): ASTM D 3420.

Films were made from the resins of this invention on high density processing lines. One line used a 1.5 inch diameter Davis-Standard extruder with L/D of 24:1, having a barrel temperature of 210° to 230° C., a screw speed of 30 rpm, and an output of 17 to 18 pounds per hour, feeding a 2 inch diameter Sano die having a 35 mil gap. Films of typically 0.001–0.0005 inch (1 to 0.5 mil) thickness were blown on a 4:1 blow-up ratio and a production rate of 65 ft/min. Frostline heights were usually 14 inches. After cooling, the film passed through an A-frame with a resultant flattened width of 12.5 inches.

A second line was a Sano 8-inch diameter die with 35 mil die gap. The Egan extruder was a 3.5 inch diameter 24:1 L/D Egan smooth barrel without grooves, containing a 2-stage screw with Dulmage mixing section. Thus a 50 inch bubble was blown with a 4:1 blow-up ratio and 56 inch frostline height. Bubble layflat was 50 inches. Typical melt temperatures ranged from 210° to 250° C.

EXAMPLE 1

This example demonstrates the preferred procedure of polymerization according to this invention. A high porosity silica-titania (2.5 cc/g, 500 m²/g, 5 weight percent titanium) containing 1 weight percent chromium was activated by fluidization in dry air at 650° C. for six hours. The catalyst was cooled in nitrogen and exposed to 10 volume percent carbon monoxide in nitrogen for another two hours at 350° C., followed by a nitrogen purge and cooling to 25° C. in nitrogen. This catalyst was used to polymerize ethylene and 1-hexene in the loop reactor described above at 82° C. Isobutane served as the diluent; ethylene was added to maintain 7-8 mole percent of the diluent. Hexene was added to maintain a hexene/ethylene weight ratio of 0.146, and hydrogen was added to maintain 0.5 mole percent of the diluent. The catalyst was precontacted with triethyl boron (TEB) for about ten minutes before being fed into the reactor. TEB was added to maintain about 4.5 ppm of the diluent. During polymerization, the reactor contained approximately 60 percent solids by volume.

Using this procedure, a polymer of 0.922 g/cc density was produced having a bulk density of 0.36 g/cc, and a productivity of 2440 g polymer per g catalyst. This material had a melt index of 0.16 g/10 min and a high load melt index of 18.3 g/10 min. Thus, the shear ratio (HLMI/MI) was 114. The copolymer was blown in to 0.5 mil film on the two-inch die at 218° C. at the rate of 65 ft/min, with a 4:1 blow-up ratio and a 14 inch frostline height. Blowing was accomplished quite easily. The film was tested for puncture and tear resistance and found to be extremely tough. The properties were: Dart drop, no breaks at 700 g for 0.5 mil film; Tear resistance, MD 110 g, TD 610 g; Spencer impact, no breaks at 1.6 Joules.

EXAMPLE 2

The procedure above was repeated except that the triethyl boron was added directly to the reactor instead of first precontacting the catalyst. Consequently, a little more hexene was required (hexene/ethylene=0.158) to produce a slightly higher density copolymer (0.923 g/cc). Other conditions were similar to Example 1; hydrogen 1.0 percent; triethyl boron 4.4 ppm; productivity 2860 g/g. The reactor was slightly more full, at 75 volume percent solids, and the polymer bulk density was slightly less, at 0.32 g/cc. The copolymer produced had a melt index of 0.20 g/10 min and a high load melt index of 20 g/10 min, so that HLMI/MI=100. This copolymer was blown on the same 2 inch line into 1.0 mil film which was extremely tough: Dart drop, no breaks at 700 g; Tear resistance, MD 149 g, TD 610 g; Spencer impact, no breaks at 1.6 Joules.

EXAMPLE 3

In this example the same silica-titania and chromium catalyst was used in several experiments but it was not reduced with carbon monoxide. Consequently, much more hexene was required in the reactor to produce the desired density, i.e. these catalysts copolymerized hexene less efficiently. Table I summarizes several comparative runs. Notice that for a given comparison (301 vs 302 or 303 vs 304 and 305) that the invention runs required less hexene and produced lower density copolymer.

TABLE I

| Run: | 301 | 302 | 303 | 304 | 305 |
|---|---|---|---|---|---|
| Act. Temp. (°C.): | 593 | 593 | 677 | 649 | 649 |
| CO Reduction: | NO | YES | NO | YES | YES |
| Reactor Temp.(°C.): | 82 | 82 | 85 | 86 | 82 |
| C6/C2 (wt): | 0.194 | 0.164 | 0.179 | 0.148 | 0.099 |
| MI (g/10 min): | 0.18 | 0.08 | 0.23 | 0.12 | 0.30 |
| HLMI (g/10 min): | 23.5 | 9.8 | 26.3 | 11.6 | 27.3 |
| HLMI/MI: | 131 | 123 | 114 | 97 | 91 |
| Density (g/cc): | 0.928 | 0.926 | 0.929 | 0.926 | 0.918 |

EXAMPLE 4

This example demonstrates that adding triethyl boron (TEB) to the reactor curtails the tendency of polymer resins to swell in the diluent. Swelling is a particularly troublesome problem when making low density copolymers such as those of this invention, and it is usually necessary to reduce the reactor temperature in order to prevent fouling. However, it was found that adding a few ppm of TEB to the diluent reduces the amount of swelling considerably, sometimes from 80 volume percent solids down to the more preferable 50 volume percent. While not wishing to be bound by theory, one possible explanation is that since the solvating power of the diluent is not changed by TEB, it seems more likely that TEB interacts with this particular catalyst to affect the polymer being produced. Table II below gives one example of this theory. Notice that bulk density, another indication of swelling, can be increased, which is economically desirable, with the use of TEB.

TABLE II

| Run: | 401 | 402 |
|---|---|---|
| Reactor Temp.(°C.): | 87.7 | 86.7 |
| Density (g/cc): | 0.925 | 0.925 |
| TEB (ppm): | 0 | 2 |
| Vol. % Solids: | 68 | 55 |
| Bulk Density (g/cc): | 0.30 | 0.34 |

Catalyst: Silica-titania (5% Ti), 1% Cr; Air 649° C.; Co 350° C.

The difference in "reactor fullness", i.e. volume solids concentration, and bulk density between Runs 401 and 402 indicate that the effect is maximized by precontacting the catalyst with TEB.

EXAMPLE 5

This example demonstrates the use of other comonomers to produce film. The procedure of Example 1 was repeated with the same catalyst, except that the comonomer was changed to 1-butene, 4-methyl-1-pentene (4MP1), or 1-hexene. Other conditions varied slightly and are detailed in the table below. After the copolymers were produced, they were blown into 1.0 mil thick film on the same 2 inch line described in the above examples. Film properties are shown in Table III.

TABLE III

| Run: | 501 | 502 | 503 |
|---|---|---|---|
| Comonomer: | 1-Hexene | 1-Butene | 4MP1 |
| Comonomer/Ethylene (wt): | 0.148 | 0.108 | 0.132 |
| Hydrogen (mol %): | 0 | 0 | 0 |
| Reactor Temp. (°C.): | 85.5 | 84.4 | 88.3 |
| Productivity (g/g): | 4000 | 3333 | 1700 |
| Melt Index (g/10 min): | 0.12 | 0.16 | 0.16 |
| High Load Melt Index (g/10 min): | 11.6 | 15.7 | 13.9 |
| HLMI/MI: | 97 | 98 | 87 |
| Density (g/cc): | 0.925 | 0.922 | 0.927 |
| Dart Impact (g): | >700 | 270 | >700 |
| Tear Resistance | | | |
| MD (g/mil): | 76 | 44 | 87 |
| TD (g/mil): | 490 | 440 | 660 |
| Spencer Impact (J): | >1.6 | 1.0 | >1.6 |

EXAMPLE 6

This example demonstrates the importance of keeping the density low, preferably below 0.930 g/cc. The procedure of Example 1 was repeated using the same catalyst, 4-methyl-1-pentene as comonomer, and the amount of comonomer was varied to change the density of the copolymer produced. Again, these copolymers were blown into 1 mil film on the same 2-inch line as in the above examples. Results are listed in Table IV. Notice that impact and machine direction tear resistance are improved at the lower density.

TABLE IV

| Run: | 601 | 602 |
|---|---|---|
| Reactor Temp.(°C.): | 90.5 | 88.3 |
| Comonomer/ethylene (wt): | 0.103 | 0.132 |
| Density (g/cc): | 0.932 | 0.925 |
| Melt Index (g/10 min): | 0.18 | 0.16 |
| High Load Melt Index (g/10 min): | 13.0 | 13.9 |
| HLMI/MI: | 72 | 87 |
| Film Thickness (mil): | 1 | 1 |
| Dart Impact (g): | 330 | >700 |
| Spencer Impact (J): | 1.5 | >1.6 |
| Tear Resistance | | |
| MD (g/mil): | 38 | 87 |
| TD (g/mil): | 627 | 660 |

EXAMPLE 7

This example demonstrates the superior flow and processing which the copolymer resins of this invention provide compared to conventional linear low density polymers. Two films were blown on the same 2-inch line as above at 1 mil thickness, one using a copolymer of this invention made from 4-methyl-1-pentene, at a reactor temperature of 86.7° C., a 4MP1/ethylene weight ratio of 0.134, and a resultant density of 0.925 g/cc; the other was a resin commercially available from Union Carbide sold under the name UCC-7066 ® and made with 1-hexene. Conventional LLDPE resins such as UCC-7066 ® typically have a narrow molecular weight (Mw) distribution and a high melt index to compensate for the resultant poor flow characteristics. In contrast, the copolymers of this invention have a broad Mw distribution and a high shear ratio (HLMI/MI) which impart good flow characteristics during the blowing of film. Characteristics are shown by higher blowing rates. In Table V the maximum blowing speed is shown by extruder rpm and line speed. In each run, the copolymer resin was extruded at the highest rate possible before the onset of melt fracture and bubble instability.

TABLE V

| Run: | 701 | 702 |
|---|---|---|
| Type: | Invention | UCC-7066 ® |
| Processibility | | |
| Screw rpm: | 75 | 30 |
| Rate, lb/hr: | 42.7 | 19 |
| Speed, ft/min: | 71 | 37 |
| Properties | | |
| Dart Impact (g): | >700 | 110 |
| Spencer Impact (J): | >1.6 | 0.82 |
| Molecular Character | | |
| Melt Index (g/10 min): | 0.09 | 0.9 |
| High Load Melt Index (g/10 min): | 6.2 | 23.9 |
| Shear (HLMI/MI): | 69 | 27 |
| Typical Mw/Mn: | 10-18 | 4-8 |

Thus, the copolymer resins of this invention exhibit improved processing characteristics despite having a lower melt index.

EXAMPLE 8

This example demonstrates the blowing of copolymer resins made according to this invention on a commercial scale film line at higher rates. Two inventive resins and two commercial controls, sold by Phillips as Marlex TR-130 ® and by Dow as 2045 ®, were blown into 1 mil film on a Sano 8-inch diameter line with 35 mil die gap. The connected extruder was a 3.5 inch diameter 24:1 L/D Egan smooth barrel without grooves, containing a 2-stage screw with Dulmage mixing section. A 50 inch bubble was blown with 4:1 blow-up ratio and 56 inch frostline. Data is shown in Table VI.

TABLE VI

| Run: | 801 | 802 | 803 | 804 |
|---|---|---|---|---|
| Resin | Invention | Invention | TR-130-® | DOW-2045-®* |
| Density (g/cc): | 0.924 | 0.924 | 0.937 | 0.920 |
| High Load Melt Index (g/10 min): | 6.2 | 14.7 | 25 | 1 (MI) |
| Processing | | | | |
| Extruder rpm: | 35 | 50 | 45 | 45 |
| Extruder Pressure (psi): | 7000 | 7600 | 6100 | 6700 |

TABLE VI-continued

| Run: | 801 | 802 | 803 | 804 |
|---|---|---|---|---|
| Power Usage (amps): | 90 | 110 | 95 | 115 |
| Rate (lbs/in/hr): | 5.47 | 8.64 | 7.68 | 9.12 |
| Line Speed (ft/min): | 57 | 90 | 80 | 95 |
| Melt Temperature (°C.): | 232 | 241 | 232 | 218 |
| Properties |  |  |  |  |
| Dart Impact (g): | 510 | 510 | 61 | 163 |
| Spencer Impact (J/mil) | >1.6 | >1.6 | 0.34 | 0.49 |
| Tear Resistance |  |  |  |  |
| MD (g/mil): | 70 | 183 | 48 | 368 |
| TD (g/mil): | 603 | 552 | 518 | 485 |

*25 inch frostline

It can be seen from the above data that the copolymer resins of this invention process with ease on the larger line, being comparable to the commercial controls despite the higher molecular weight (i.e. lower HLMI). The good impact resistance is extremely high, and tear resistance is also good, MD tear following the density as expected.

While this invention has been described in detail for the purpose of illustration, it is not to be construed as limited thereby but is intended to cover all changes and modifications within the spirit and scope thereof.

That which is claimed is:

1. A slurry polymerization process comprising contacting in a reaction zone under polymerization conditions, at a temperature in the range of from about 82° to about 88° C.:
   (a) a diluent selected from the group consisting of paraffins, cycloparaffins, aromatic hydrocarbons, and mixtures thereof;
   (b) ethylene monomer;
   (c) at least one comonomer selected from the group consisting of 1-butene, 1-pentene, 1-hexene, 1-octene, 4-methyl-1-pentene, and mixtures thereof, present in an amount in the range of from about 5 to about 20 weight percent, based on the amount of ethylene; and
   (d) a trialkyl boron compound, present in an amount in the range of from about 0.5 to about 4 ppm, based on the mass of the diluent;
   (e) a catalyst comprising chromium supported on a silica-titania support, wherein said support comprises from about 2 to about 10 weight percent titanium, based on the weight of the support, and wherein said catalyst has been activated in a oxygen-containing ambient and subsequently reduced in the presence of carbon monoxide in an inert ambient;
   and recovering a polymer having:
   (f) a density in the range of from about 0.915 to about 0.932 g/cc;
   (g) a dart drop of greater than about 400 grams for 1 mil film;
   (h) a HLMI/MI in the range of about 70 to about 150; and
   (i) a heterogeneity index in the range of about 10 to about 20.

2. A process according to claim 1 wherein said temperature in the reaction zone is in the range of from 82° to 85° C.

3. A process according to claim 1 wherein said trialkyl boron compound is triethyl borane and is present in the reaction zone in the range of from about 1 to about 2 ppm, based on the mass of the diluent.

4. A process according to claim 1 wherein said comonomer is 1-hexene.

5. A process according to claim 1 wherein said comonomer is 4-methyl-1-pentene.

6. A process according to claim 1 wherein said catalyst activation is carried out in air at a temperature in the range of about 300° to about 1000° C. and wherein said carbon monoxide reduction is carried out at a temperature in the range of about 300° to about 500° C.

7. A process according to claim 1 wherein said silica-titania support is formed by coprecipitation.

8. A process according to claim 1 wherein said silica-titania support comprises from about 5 to about 8 weight percent titanium, based on the weight of the support.

9. A process according to claim 1 wherein said catalyst comprises from about 0.05 to about 5 weight percent chromium, based on the total weight of the catalyst after activation and reduction.

10. A slurry polymerization process comprising contacting in a reaction zone under polymerization conditions, at a temperature in the range of 82° to 85° C.:
    (a) a diluent of isobutane;
    (b) ethylene monomer;
    (c) a comonomer of 1-hexene, present in an amount within the range of about 12 to about 17 weight percent, based on the amount of ethylene;
    (d) triethyl borane, present in an amount within the range of about 1 to about 2 ppm, based on the mass of the diluent; and
    (e) a catalyst comprising chromium supported on a silica-titania support, wherein said support comprises from about 5 to about 8 weight percent titanium, based on the weight of the support, and wherein said catalyst has been activated in an oxygen-containing ambient at a temperature within the range of about 300° to about 1000° C. and subsequently reduced in the presence of carbon monoxide at a temperature within the range of about 300° to about 500° C.;
    and recovering a polymer.

* * * * *